Figure 1:
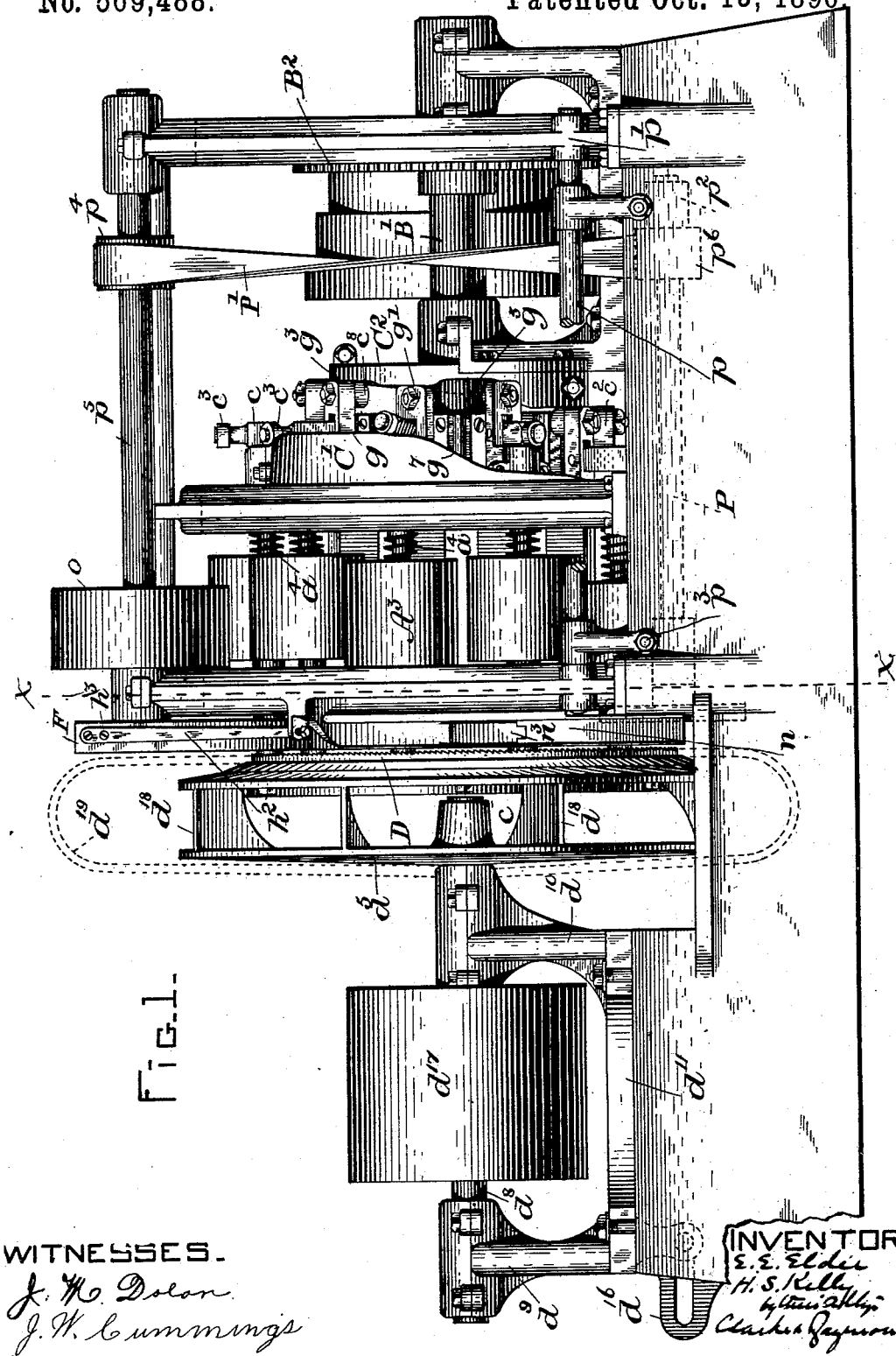

(No Model.) 6 Sheets—Sheet 1.

E. E. ELDER & H. S. KELLY.
MACHINE FOR MAKING BUNGS.

No. 569,488. Patented Oct. 13, 1896.

WITNESSES.
J. M. Dolan
J. W. Cummings

INVENTORS
E. E. Elder
H. S. Kelly (No Model.) 6 Sheets—Sheet 2.

E. E. ELDER & H. S. KELLY.
MACHINE FOR MAKING BUNGS.

No. 569,488. Patented Oct. 13, 1896.

WITNESSES.
J. M. Dolan.
J. W. Cummings.

INVENTORS
E. E. Elder
H. S. Kelly
by their Attys
Clarke & Raymond (No Model.)  6 Sheets—Sheet 3.

E. E. ELDER & H. S. KELLY.
MACHINE FOR MAKING BUNGS.

No. 569,488. Patented Oct. 13, 1896.

WITNESSES
J. M. Dolan
J. W. Cummings

INVENTORS
E. E. Elder
H. S. Kelly
by their Atty.
Clarke & Raymond (No Model.) 6 Sheets—Sheet 4.

E. E. ELDER & H. S. KELLY.
MACHINE FOR MAKING BUNGS.

No. 569,488. Patented Oct. 13, 1896.

WITNESSES.
J. M. Dolan.
J. W. Cummings

INVENTORS
E. E. Elder
H. S. Kelly
by their Attys
Clarke & Raymond

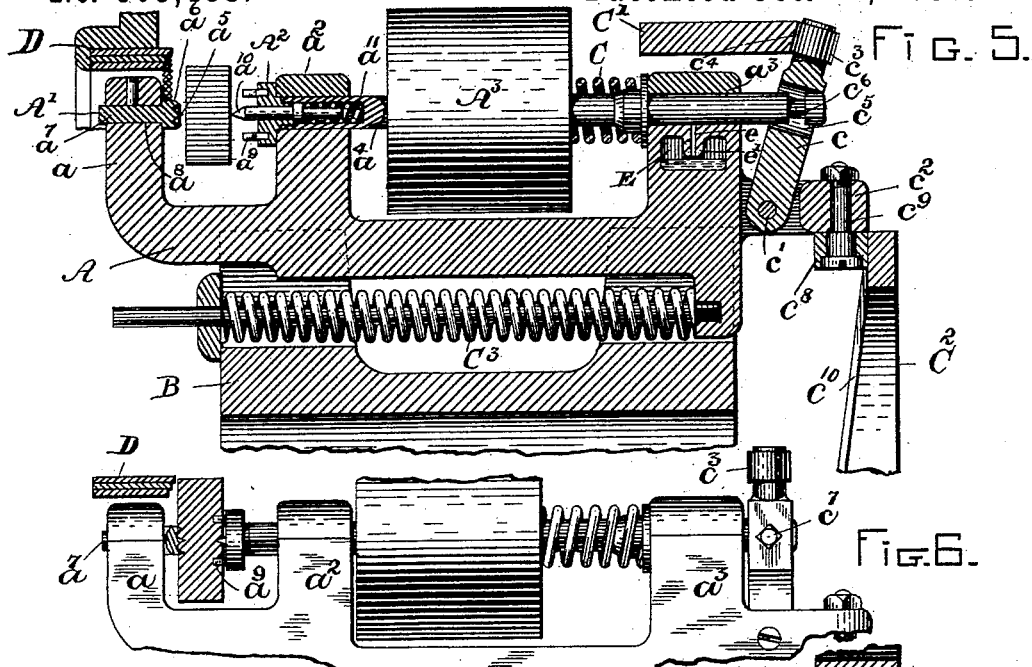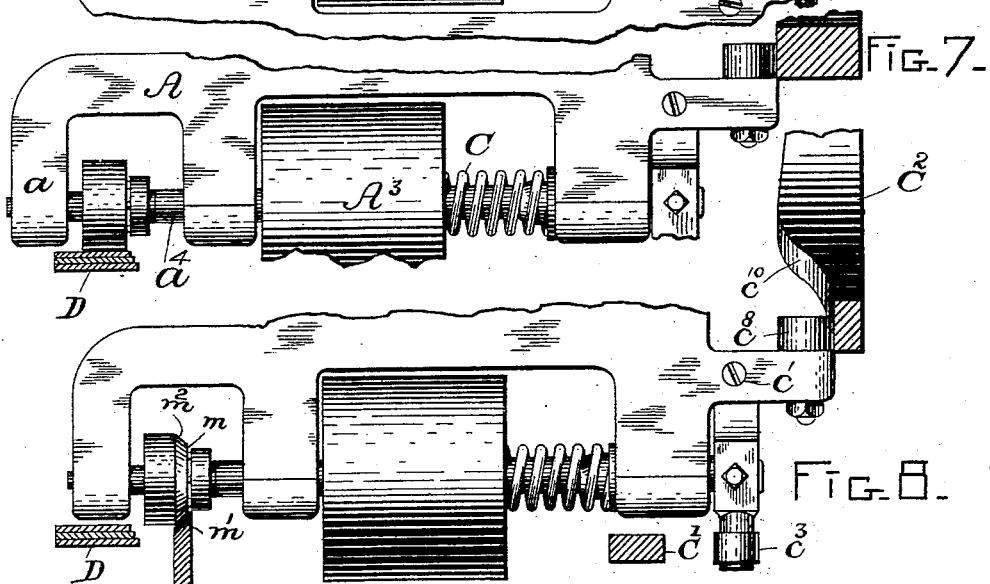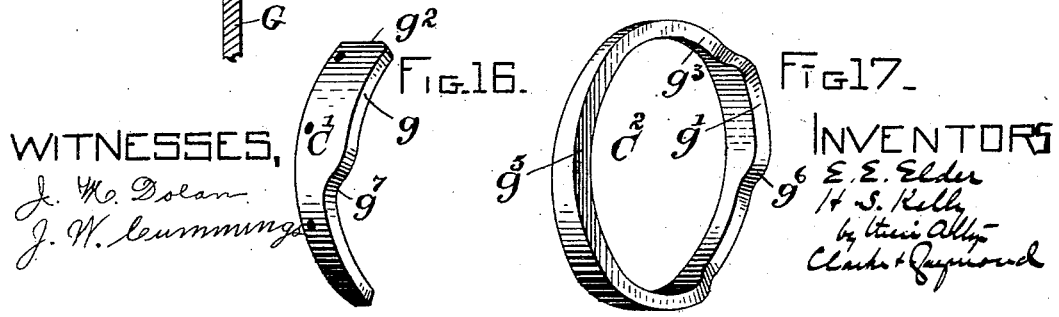

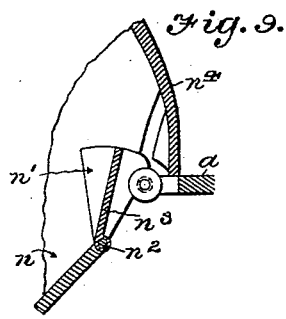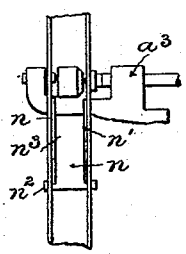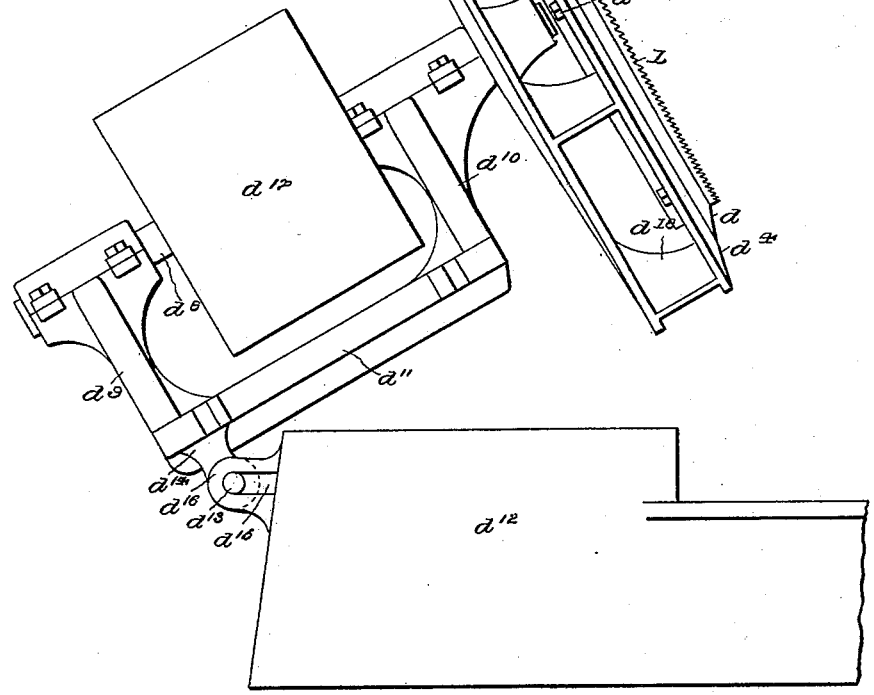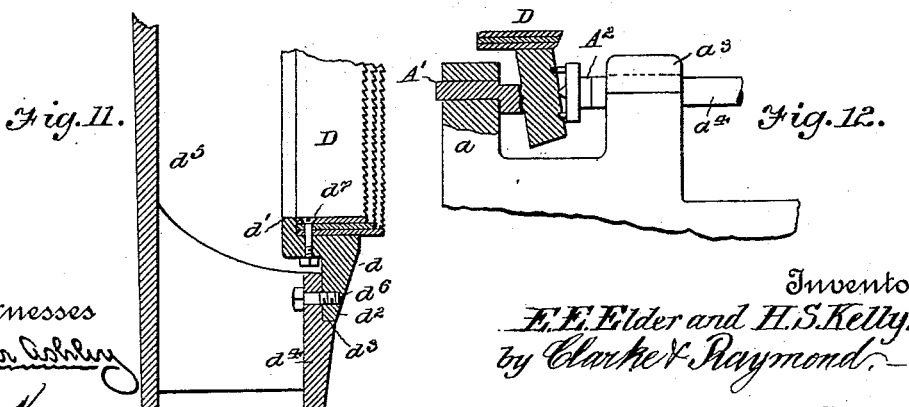

UNITED STATES PATENT OFFICE.

EDWARD E. ELDER, OF LYNN, AND HERBERT S. KELLY, OF SALEM, MASSACHUSETTS, ASSIGNORS TO THE ELDER MANUFACTURING COMPANY, OF PORTLAND, MAINE, AND LYNN, MASSACHUSETTS.

MACHINE FOR MAKING BUNGS.

SPECIFICATION forming part of Letters Patent No. 569,488, dated October 13, 1896.

Application filed July 18, 1892. Serial No. 440,364. (No model.)

*To all whom it may concern:*

Be it known that we, EDWARD E. ELDER, residing at Lynn, and HERBERT S. KELLY, residing at Salem, in the county of Essex, State of Massachusetts, citizens of the United States, have invented a new and useful Improvement in Machines for Making Bungs and Similar Articles, of which the following is a full, clear, and exact description, reference being had to the accompanying drawings, forming part of this specification, in explaining its nature.

The invention relates to a machine for the manufacture of bungs and analogous articles in which the bung or other blanks are fed to a series of rotary holders, which are in turn caused to revolve around a common center and to have longitudinal movements in relation to a band-saw or series of band-saws or other equivalent cutting devices which are rotated in a circular path, and by means of which turning longitudinally-movable rotary blank-holders the blanks are in successive and continuous order presented to the cutting devices and gradually reduced to shape from surface to surface, that is, while they are individually revolving upon their own centers they are as a collective series being moved around a common center, and are being fed toward and from the cutting devices.

The invention further relates to means for feeding the bung or other blanks successively and continuously to the turning blank-holders without stopping the action of the machine.

It further relates to means for removing the finished bungs or other articles from their holders automatically and without stopping the machine.

It further relates to means for beveling automatically the edge or corner of each bung or other article while it is rotating in its holder and being moved to the ejecting position.

It further relates to means for simultaneously rotating a number of blank-holders and at the same time revolving or turning them upon a common center.

It also relates to the manner of supporting the band-saws and to their movement with their holder from operative position; also, to the means for operating the various devices whereby each of the distinctive parts, namely, the cutting instruments or saws, the chamfering or beveling saws, and the blank-holders, may be run or actuated independently of the others.

It further relates to various details of construction and organization, all of which will be hereinafter fully described.

Figures 2, 13, 14:
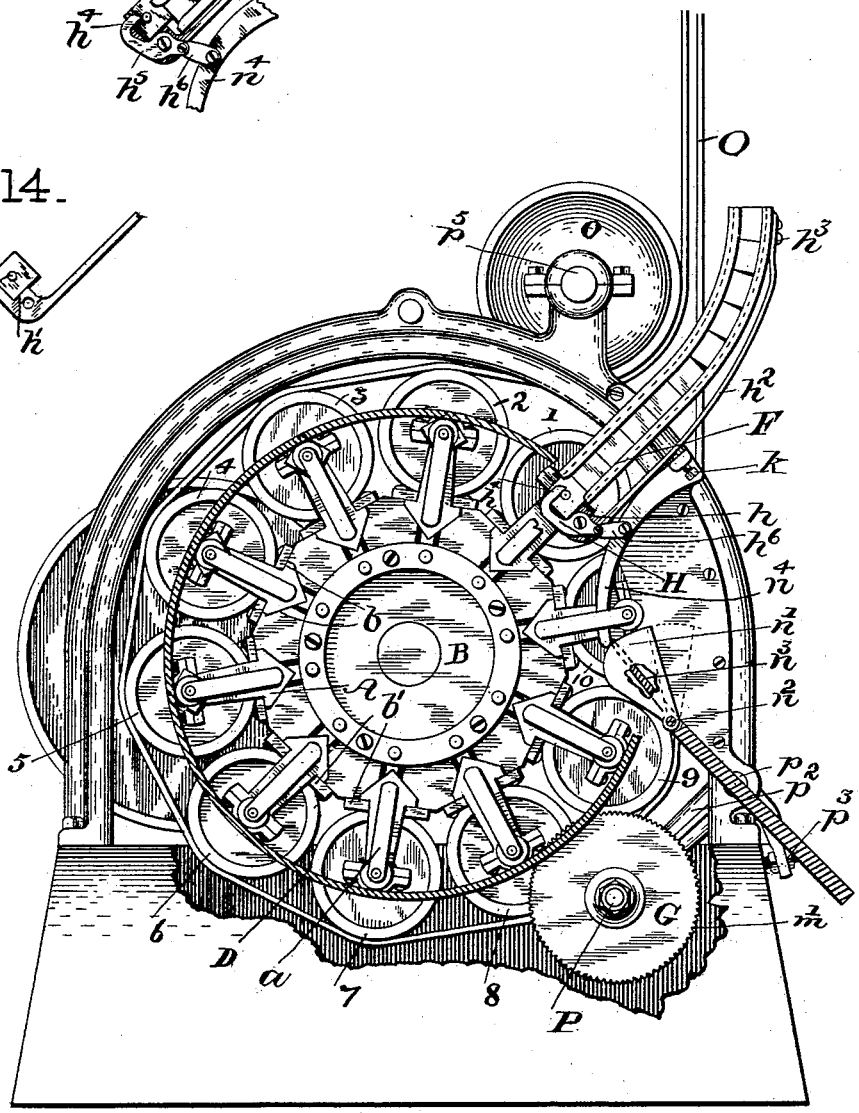
Figure 3:
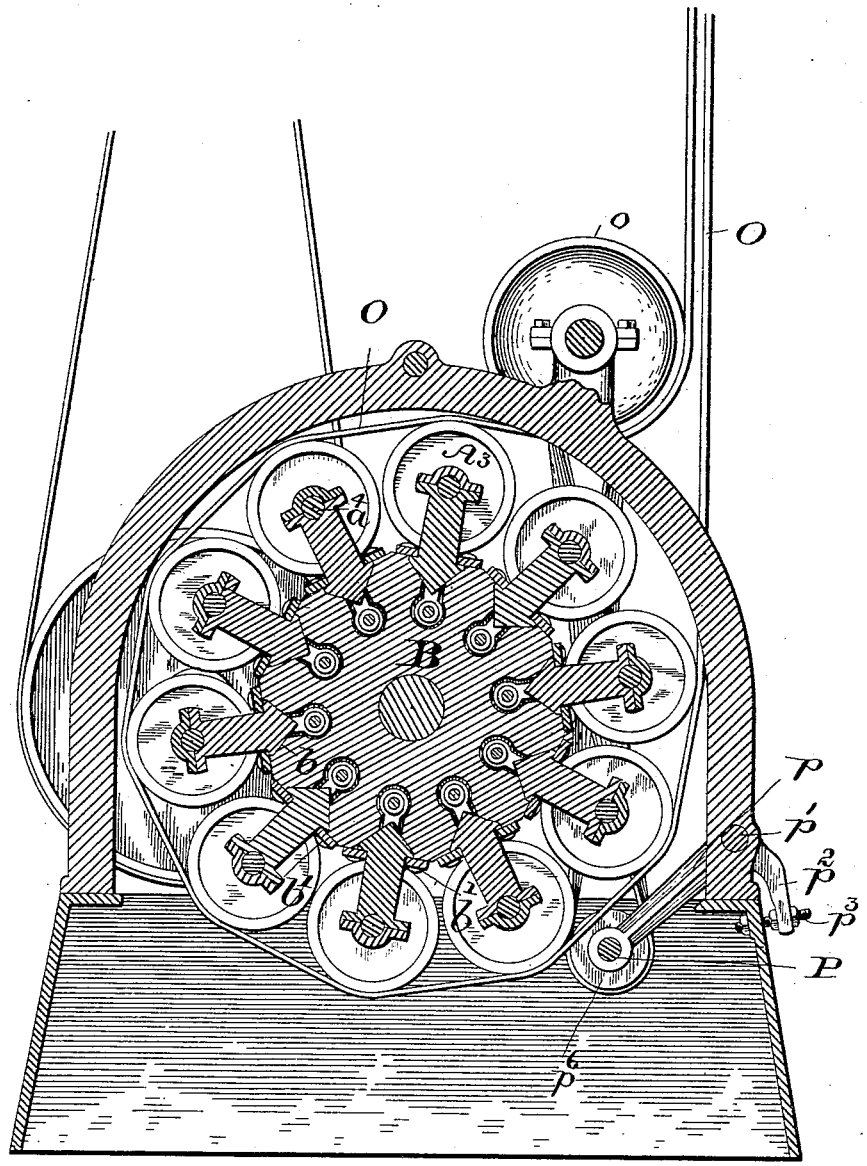
Figure 4:
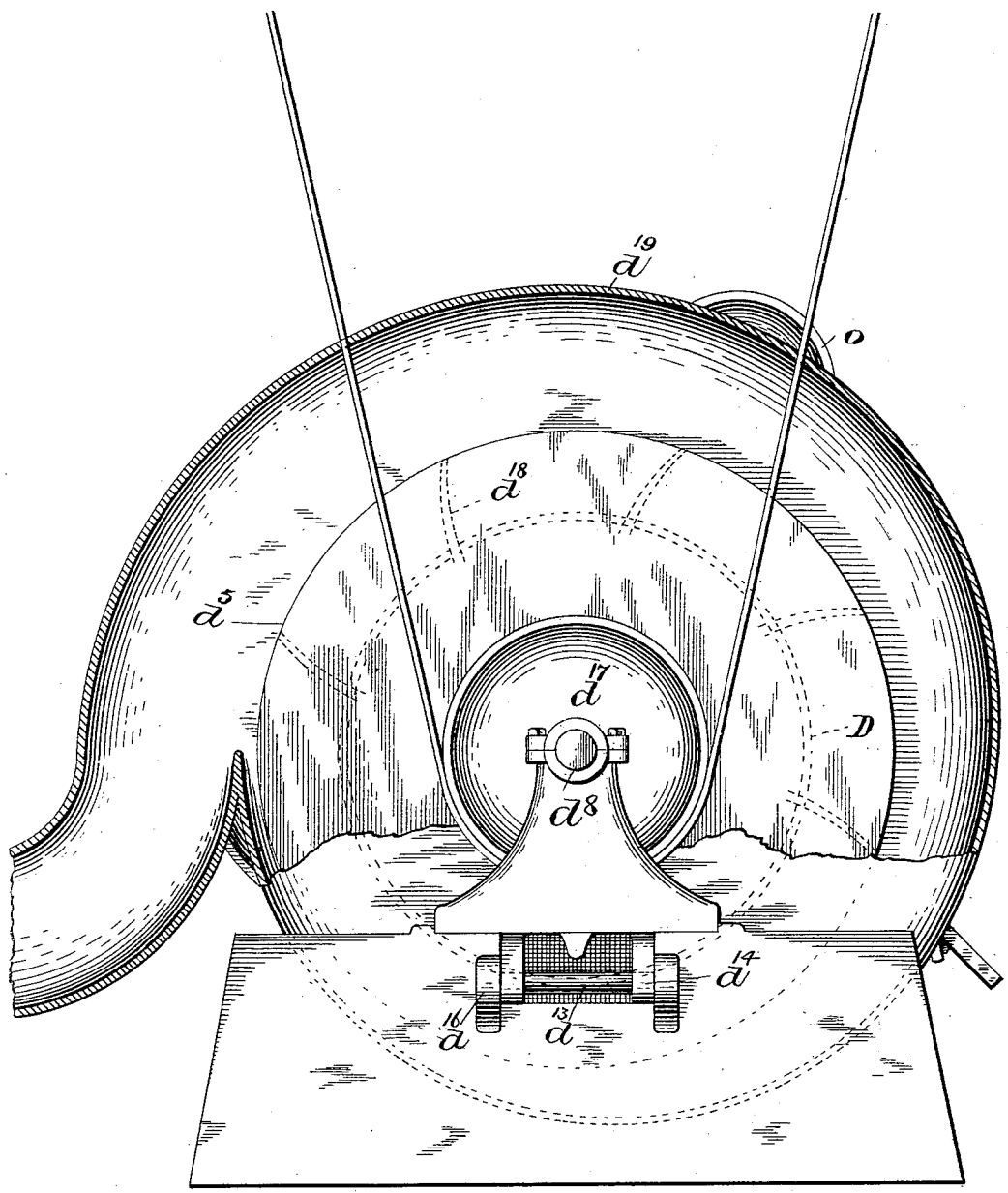

In the drawings, Figure 1 is a view in side elevation of a machine having the features of our invention. Fig. 2 is a view principally in end elevation taken from the back edge or center of the saws, the saws being shown in vertical section excepting so much as is removed to illustrate the blank-feeding devices and the blank-ejecting mechanism. Fig. 3 is a view in vertical section upon the dotted line X X of Fig. 1. Fig. 4 is a view principally in end elevation representing the saw carrier or support, arranged to form a blower and a blower casing or shell about it. Figs. 5, 6, 7, and 8 represent the various positions into which the bung-blanks are caused to be fed and in relation to the cutting-saws and the chamfering-saw by their holders. Fig. 9 is a detail view, looking forward from the back of the machine, of the device for ejecting or removing the bung from the machine. Fig. 10 is a view in elevation representing the manner of supporting the saw-frame and saws by means of which they are made removable from their operative position. Fig. 11 is a detail view in a section illustrating a section of the saw-holding frame and the manner of securing the saws to it. Fig. 12 is a view representing the manner of holding a bung-blank to cause it to be turned to a tapering surface. Figs. 13 and 14, Sheet 2, are detail views of a portion of the mechanism for delivering the blanks from the feed-chute to the various holding-chucks. Fig. 15 is a detail view in elevation to further illustrate a part of the bung-ejecting devices. Figs. 16 and 17, Sheet 5, are views in perspective of cams for operating the blank-holders and chuck, reference to which will be hereinafter made.

In practice as many blank-holders may be used or employed as is desired. In the drawings we have represented ten, which are numbered 1 to 10, inclusive, and in the order in which they are turned upon their common center, the holder 1 being in a position to receive a blank, and the holder 10 being in the act of delivering a finished bung. The various blank-holders are made alike. Each is mounted upon a slide or carriage, which in turn is mounted upon a revolving support, hub, or bed, and each is controlled as to its rotation and as to its slide movements and as to its closing and opening movements by the same instrumentalities in successive order. Therefore a description of one blank-holder, its movements, and devices for actuating it will answer for a description of all.

A represents the slide-frame upon which the blank-holder is mounted. This slide-frame is shaped preferably, as represented in Figs. 2, 3, and 5, so as to be movable in guideways $b$ in the rotary bed B, and upon a line parallel with the axes of said bed. The shape of the sliding portion of the slide-frame is preferably, although not necessarily, inclined or tapering, and its holding-recess is correspondingly tapered or inclined, the cap-plates $b'$ lapping upon sections of the slide-frame to hold it in place. This inclined or tapering construction is desirable because it helps rather than injures the fit of the members as they become worn.

The slide-frame A has an arm or standard $a$ at its forward end, which carries the member A′ of a blank chuck or holder, and it has also the arm or standard $a^2$ and the arm or standard $a^3$, which together support or furnish bearings for the shaft $a^4$. The shaft $a^4$ at its front end carries the other member $A^2$ of the chuck or blank holder.

The member A′ has the spur $a^5$, annular shoulder $a^6$, and spindle $a^7$, which enters the hole $a^8$ in the arm $a$.

The member $A^2$ has the teeth $a^9$ and the central yielding support $a^{10}$, which is forced outward from the face of the member $A^2$ by the spring $a^{11}$, the support having a rearward-extending shank, which is held in a hole in the chuck or shaft end, and the spring bears outwardly against a collar $a c$ upon the spindle.

The shaft $a^4$ and the member $A^2$ of the chuck or blank holder are rotated by the pulley $A^3$, and with the pulley are movable longitudinally to cause the section $A^2$ of the chuck or blank holder to be moved toward and from the member A′.

The movement toward the member A′ is produced by the spring C, which surrounds the shaft $a^4$ and bears against the pulley $A^3$ or a shoulder on the shaft, serving to move the member $A^2$ of the chuck or blank holder toward the member A′ when permitted by the cam C′.

The slide-frame A is controlled as to its sliding movements by means of the stationary cam $C^2$ and the spring $C^3$, the cam moving the slide-frame, and consequently the blank-holder or chuck, and the blank toward the blank-cutting saws D, and the spring $C^3$ moving the slide, chuck, and blank in the reverse direction.

The chuck-shaft $a^4$ is represented as connected with its controlling-cam C′ by means of the lever $c$, which is pivoted upon pivot-pins $c'$ of the rearward-extending arm $c^2$, the lever having at its upper end a cam-roll $c^3$, which bears upon the edge $c^4$ of the cam C′.

The lever $c$ is connected with the shaft by extending the rear end of the shaft into the hole $c^5$ in the lever and forming in the shaft a recess or groove $c^6$ and extending into the groove the ends of screws $c^7$, Fig. 6, the shaft of course being free to turn, the ends of the screws entering the groove only sufficiently far to properly attach the shaft to the lever.

The arm $a^3$ is represented as having the oil-receiver E below the shaft-bearing, which is connected with the shaft-bearing by the hole $e$, the hole being formed to extend through a downward-extending teat or section $e'$, which projects into the oil-chamber.

The slide-frame A is connected with its controlling-cam $C^2$ by means of the cam-roll $c^8$ upon the stud $c^9$ at the end of the arm $c^2$. (See Fig. 5.) This cam-roll $c^8$ bears against the cam-surface $c^{10}$.

The cams C′ $C^2$ are stationary and are formed upon the edges of circular or cylindrical pieces, which are rigidly secured to the frame of the machine, and they are shaped to give the blank-holder and the members of the chuck the following-described movements in relation to the feedway F, through which the blanks are fed to the machine—the rotary blank-saws D, the chamfering-saw G, and the bung-ejecting devices—as follows: first, to move or bring the slide-frame into such relation to the end of the blank-feeding chute F, Figs. 1 and 2, as to cause the member A′ of the blank-chuck to be entirely without the line of the feedway, so that the blank shall be free to drop into position between the member A′ and the member $A^2$, which has also been drawn back by its actuating-cam C′. These sections of the cams C′ and $C^2$ are lettered, in Figs. 16 and 17, $g$ and $g'$, respectively, the parts then bearing the relation to each other represented in Fig. 5. The lowermost blank is held at the lower end of the chute in a position to be grasped by the two members of the chuck by a receiver and transferrer H, (see Figs. 2, 13, and 14,) which has the blank-rest $h$. The edge $h'$ of the receiver and transferrer is upon a line with the outer edge of the chute, and the receiver is of a shape to permit it to be drawn under the chute in transferring the blank. It is held or supported by the long spring $h^2$, fastened at $h^3$, and it acts to support and transfer the blank during a portion of the turning movement of the chuck and while the members of the chuck are being released or moved by their operating devices sufficiently to cause, first, the member A′ to be moved toward the blank upon the end of the central support $a^{10}$, and, second, the member $A^2$ to be forced toward the member $A'$ or to the position represented in Fig. 6. To understand this movement, it must be borne in mind that the bed B and the blank-holders are constantly rotating; in other words, that the blank-holders do not stop their turning movement about a common center when they reach the end of the chute F and that the members of the chuck are opened, immediately before they reach the end of the chute F, sufficiently to permit them to pass upon the blank. When they reach the center of the blank, the blank is immediately moved onward with the chuck by the transferrer H, which is caused to be moved by the engagement of the shank of the member $A'$ of the chuck with the end $h^4$ of the hook $h^5$, (see Figs. 2, 13, and 14,) which is in line with the track upon which said shank is being turned, and for a limited period the engagement of the shank of this member of the chuck and the hook continues. This relation of the parts to each other continues during the closing movements of the members of the chuck upon the blank. When they have so been closed by the action of sections $g^2$ and $g^3$ of the cams $C'$ and $C^2$, the hook is automatically disengaged from the clutch-spindle and with the transferrer is returned by the spring $h^2$ to its original position. The upper surface of the transferrer prevents the next block in order in the chute from falling while it is thus being moved onward and until it has been restored to its normal position or that represented in Fig. 2.

The position which the transferrer and hook occupy at the end of their forward movement and at the time of the positive engagement of the members of the chuck with the blank is represented in Fig. 13. The hook becomes disengaged from the chuck-spindle because of the position which the pivot of the hook bears to the end of the hook and the track upon which the chuck-spindle is moving and also because the hook is restrained by a positive stop $h^6$, which causes the hook to throw down to the continued action of the clutch-spindle upon it. The blank having thus been delivered from the chute to the chuck is, upon the engagement of the chuck with it, caused to rapidly rotate and is then presented or fed gradually to the rotary cutters D. These cutters or band-saws rotate in a direction the same as that of the turning of the bed B and opposite that of the rotation of the blank, and the feeding movement of the blank to the rotary saws continues while the blank and saws are traveling in opposite directions and until the entire edge of the blank has been acted upon by the saws and reduced to circular shape. About half of the revolution of the bed B is used in this turning action; that is, the blank is being moved toward the saws from the position marked 2 in Fig. 2 to the position marked 7 and until the blank has passed the cutting edges of the saws, as shown in Fig. 7. This feeding movement is caused by sections $g'$ of the cam $C^2$. The turned blank is then with its chuck quickly moved backward from the position indicated in Fig. 7 and at the point 7, Fig. 2, to the position represented in Fig. 8. This brings its edge $m$ in the path of the bevel-cutting edge $m'$ of the circular saw G, and as the blank which is rotating is being carried past the edge of this saw the chamfer or bevel $m^2$ is formed.

The member $A'$ is, when the holder has been moved to the position 9, Fig. 2, moved by the section $g^6$ of the cam $C^2$ away from the member $A^2$ and from the blank, and the member $A^2$ is by the section $g^7$ of the cam $C'$ drawn away or disengaged from the bung, the bung having been moved into a recess $n$, formed by the plates $n'$, or one plate and the chute-wall, the recess being of a width to receive a portion of the bung and the edges of the plates $n'$ being in line with the chuck-spindles as they are lifted toward the plates.

The plates have hinges $n^2$ (see Figs. 9 and 15) and are caused to be lifted by the continued turning movement of the chuck-spindles, and after the position 10, Fig. 2, is reached the plates return to their original position, falling off the spindles of the chuck and bringing into position the incline $n^3$, down which the bung drops or rolls from the opened members of the clutch to the escape-passage, the plates $n'$ also forming a portion of this tilting section of the escape-chute.

To further assist in feeding the completed bung from its holder, there is arranged a curved arm or stop $n^4$, Fig. 9, to project downward and form a barrier against which the bung comes in contact after the opening of the chuck and falling of the incline, and by which its further movement is restrained or held while the holder continues its onward movement.

It will thus be seen that the ejecting mechanism comprises devices for holding the completed bung while the chuck is being opened, for receiving it as it leaves the chuck, and for freeing it from the chuck if it should so need.

It will also be seen that the section $n^3$ of the chute and the plates $n'$ perform important duties in that they lift to permit the passage of the completed bung, then drop to hold it while the members of the chuck are being withdrawn from it, and then act as a guide and entrance to the chute through which the bung may escape.

The various blank-holders are rotated upon their own axes by the belt O, (see Figs. 2 and 3,) which passes around the holders from the guiding-pulley $o$, and in its course it bears constantly upon all the pulleys of the various holders, excepting the one which is receiving the blank from the feed-chute.

The belt passes to a driving-pulley upon a counter or other shaft and affords means whereby the various holders may be rotated independently of the other operating mechanism.

The bed B is mounted at the end of the shaft B', and it is rotated at any desired speed by means of the gear B² and a pinion on a counter-shaft run by an independent belt.

The chamfering saw or saws G, Fig. 2, as more than one may be employed, are mounted upon the shaft P, Fig. 1, which is supported by an adjustable hanger $p$, the hanger being pivoted at $p'$ to the frame, (see Fig. 3,) and having an arm $p^2$, through which extends the adjusting-screws $p^3$, Fig. 1. By moving the adjusting-screw as desired the shaft P and the cutting edge of the circular saw are adjusted or varied in relation to the center of the blank-holding chuck. This shaft is rotated by means of the belt $p'$, running from the pulley $p^4$ on the shaft $p^5$, upon which is the pulley $o$, (see Fig. 1,) the belt passing to the pulley $p^6$ on the said shaft P.

The cutting devices D may comprise a single band-saw or two or more concentrically arranged, one within the other, as represented in Fig. 11, the cutting-teeth of the outer one extending in advance of the cutting-teeth of the next one in order. These saws are cylindrical in shape, and are carried by a holder $d$, the saws fitting the bore of the holder with their back edges bearing against the shoulder $d'$. The saw holder or support $d$ has also a radial flange $d^2$, which fits the radial recess $d^3$ in the plate $d^4$ of the revolving frame $d^5$. The flange $d^2$ is fastened by screws or bolts $d^6$ to the plate $d^4$, and is therefore readily detached from it. The saws are fastened to the holder or support $d$ by screws or bolts $d^7$ in a manner to permit them to be easily removed.

The frame $d^5$ is carried at the end of shaft $d^8$. This shaft has bearings in boxes at the upper end of the arms $d^9$ $d^{10}$, respectively, the arms being integral with the base-plate $d^{11}$. This plate is bolted to the bed $d^{12}$ when the machine is in use.

In order that the saws may be reached and changed, the plate $d^{11}$ is arranged to be moved or slid longitudinally upon the bed $d^{12}$ and to be turned upward on the pivot $d^{13}$. This pivot is attached to the downwardly-extending lugs $d^{14}$ and extends into the horizontal slots $d^{15}$ in the bed-lugs $d^{16}$. (See Figs. 4 and 10.)

The shaft $d^8$ is rotated by the pulley $d^{17}$ and its actuating-belt. The frame $d^5$ is provided with curved blades $d^{18}$, which act, in conjunction with the casing $d^{19}$, to form an exhaust-blower for drawing the sawdust from the saws and blowing it from the machine.

To turn a blank with a tapering edge, one chuck member may be placed out of line with the other, as represented in Fig. 12. The blanks are fed to the feed-chute F in any desired way. The position of the transferrer H in relation to the end of the chute is regulated by the screw $k$. The spring C³, for moving the slide-frame backward and holding its cam-roll in contact with the operating-cam C², is preferably held by a guiding-rod attached at one end to a downward-extending section of the slide-frame and working at the other end through a hole in a stationary holding-plate. (See Fig. 5.)

The operation of the machine is as follows: Blanks, preferably square in form, are fed by gravity or otherwise continuously through the chute F. The various blank-holders are constantly turning with their bed, and as they reach the end of the chute the chucks are opened, the lowermost blank is transferred to the members of the chucks, the chucks are closed, the blank is rotated, and fed as it is rotated to the action of the rotary cutting devices, thence to the chamfering saw or saws, and thence to the ejector. It will be seen that by this organization the same cutting devices are acting simultaneously upon any desired number of blanks and that any desired number of blanks are being simultaneously rotated and presented to the cutting saws or instruments, so that simultaneously with the discharge of a blank into the machine a completed bung is ejected from it.

Having thus fully described our invention, we claim and desire to secure by Letters Patent of the United States—

1. In a machine for turning the edge of bung and other blanks, to form bungs therefrom, a rotary hub or carrying-support; a series of rotary chucks which are mounted upon such rotary hub or carrying-support each of such chucks comprising two members which have closing and opening movements relative to each other, as set forth, to close upon the blank, to hold and to rotate it, and to unclose and deliver it; rotary band-saws, one or more; and mechanism, essentially as described, for moving the chucks in successive order toward the band-saws, while turning with their rotary hub or carrying-support, and for moving such chucks away from the band-saws, in combination; substantially as and for the purposes specified.

2. The combination in a machine for forming bungs and similar articles of the rotary support and block-turning devices with the slide blank-holder A, mounted upon the rotary support to be movable lengthwise the same, and having the chuck members A' A² mounted thereon, as specified, the slide-shaft $a^4$, carrying the member A² of the chuck, the spring C, the cam C', the lever $c'$ connected with the shaft $a^4$ and bearing against the cam, and the cam C² acting against the slide A, through the cam-roll $c^8$ carried by the slide-arm $c^2$, and the spring $c^3$ acting against the slide A in opposition to the cam C², as and for the purposes described.

3. The combination in a machine for forming bungs and similar articles of the rotary and slide chucks, and the blank-turning devices, the feed-chute, and the blank transferrer or carrier comprising a holder having a surface upon which the blank rests and a shoulder which bears against the rear edge of the blank, and which is movable across the lower end of the feedway by the engagement of the spindle of the chuck with a latch carried thereby, said latch being pivoted and held as described, so as to be disengaged from the chuck-spindle after it has been moved a slight distance, sufficient to permit the members of the chuck to engage the blank and a spring for returning the transferrer or carrier to its original position at the end of the chute, substantially as described.

4. The combination in a machine of the character specified of the traveling and rotary chuck, an escape-chute which has its upper section hinged so as to be moved outward from the path of the blank-holder, and then to fall or move below it with chuck-separating devices, and a blank stop or stripper, substantially as described.

5. The combination of the traveling and rotary blank-holder, the plates $n'$ $n^3$ hinged as specified, and forming the upper part of the escape-chute moved by spindles of the chuck out of position to permit the passage of the formed blank, and then returning to its position beneath it to receive the form of the blank, as and for the purposes described.

6. In a machine for making bungs and similar articles the combination of the blank-holding rotating and presenting devices, the rotary band saw or saws, its or their supporting-frame provided with exhaust wings or blades, and the hood or cover to inclose the same, as and for the purposes described.

7. The combination in a machine for making bungs and similar articles of one or more band-saws which are carried by an exhaust-fan, said exhaust-fan and a casing for the same, whereby the opening to the fan is within the circle or space bounded by the saw or saws, substantially as and for the purposes described.

8. The combination of the rotary support or hub B, having the V-shaped slides, and the recesses extending inward therefrom with the blank-holders having the V-shaped sliding sections to fit the V-shaped ways and the extensions to enter the recesses, and the caps $b'$, as and for the purposes described.

9. The combination with the plate $d^4$ having the radial recess $d^3$; of the holder $d$, having the radial flange $d^2$, adapted to the recess $d^3$, and having also the shoulder $d'$; and the concentric saws D, the outer projecting beyond the inner, and both secured within the body of the holder $d$, and bearing against the shoulder $d'$; as set forth.

10. The combination with the bed $d^{12}$, having lugs $d^{16}$, $d^{16}$, each provided with a horizontal slot $d^{15}$; of the plate $d^{11}$, having downwardly-extending lugs $d^{14}$ provided with pivot-pin $d^{13}$, and having also the bearing-arms $d^9$ and $d^{10}$, carrying the shaft $d^8$, the frame $d^5$, and the saws D, as described; whereby the plate $d^{11}$ and its superposed parts, may be lifted upon its pivotal bearings, to afford ready access to the saws, for renewal, or repair.

EDWARD E. ELDER.
HERBERT S. KELLY.

In presence of—
JOSEPH F. HANNAN,
ALFRED FOSSIE.